US010068368B2

(12) United States Patent
Engel (10) Patent No.: US 10,068,368 B2
(45) Date of Patent: Sep. 4, 2018

(54) METHOD, VISUALIZATION DEVICE, AND COMPUTER PROGRAM PRODUCT FOR VISUALIZING A THREE-DIMENSIONAL OBJECT

(71) Applicant: SIEMENS HEALTHCARE GMBH, Erlangen (DE)

(72) Inventor: Klaus Engel, Nürnberg (DE)

(73) Assignee: Siemens Healthcare GmbH (DE)

( * ) Notice: Subject to any disclaimer, the term of this patent is extended or adjusted under 35 U.S.C. 154(b) by 0 days.

(21) Appl. No.: 15/512,579

(22) PCT Filed: Sep. 23, 2014

(86) PCT No.: PCT/EP2014/070231
§ 371 (c)(1),
(2) Date: Mar. 20, 2017

(87) PCT Pub. No.: WO2016/045701
PCT Pub. Date: Mar. 31, 2016

(65) Prior Publication Data
US 2017/0294042 A1   Oct. 12, 2017

(51) Int. Cl.
*G06T 15/50* (2011.01)
*G06T 15/06* (2011.01)
*G06T 15/08* (2011.01)

(52) U.S. Cl.
CPC ............ *G06T 15/506* (2013.01); *G06T 15/06* (2013.01); *G06T 15/08* (2013.01)

(58) Field of Classification Search
None
See application file for complete search history.

(56) References Cited

U.S. PATENT DOCUMENTS

| 9,330,485 | B2* | 5/2016 | Wahrenberg | G06T 15/08 |
| 9,704,283 | B2* | 7/2017 | Ozdas | G06T 15/06 |
| 2009/0225932 | A1* | 9/2009 | Zhu | A61B 6/032 |
| | | | | 378/7 |
| 2015/0164475 | A1* | 6/2015 | Kuga | A61B 8/463 |
| | | | | 600/443 |

(Continued)

OTHER PUBLICATIONS

International Preliminary Report on Patentabilityfor PCT/EP2014/070231; International Filing Date: Sep. 23, 2014; 14 pgs.

(Continued)

Primary Examiner — Yu Chen
(74) Attorney, Agent, or Firm — Schmeiser, Olsen & Watts LLP (57) ABSTRACT

The inner volume of an inhomogeneous three-dimensional object is visualized by a plurality of simulated visual rays. For a respective visual ray entering the object volume, i) a scatter position is determined along the visual ray, ii) a scatter direction is selected in dependence on a random process, and iii) the visual ray is scattered at the scatter position in the selected scatter direction. Steps i) to iii) are repeated until the visual ray is absorbed in the object volume or exits the object volume, wherein the exiting visual ray is incident on an illumination source and, in dependence on a brightness and/or color value of the illumination source, an illumination contribution of the visual ray to a respective visualization pixel is ascertained.

14 Claims, 3 Drawing Sheets

(56) References Cited

U.S. PATENT DOCUMENTS

| | | | | |
|---|---|---|---|---|
| 2015/0262416 | A1* | 9/2015 | Hecht | G06T 15/08 345/424 |
| 2016/0140770 | A1* | 5/2016 | Jonsson | G06T 15/08 345/420 |
| 2016/0292913 | A1* | 10/2016 | Wahrenberg | G06T 15/506 |

OTHER PUBLICATIONS

Pawasauskas J.: "Volume Rendering with Ray Casting"; pp. 1-14; XP055190751; Gefunden im Internet: URL:http://web.cs.wpi.edu/-matt/courses/cs563/talks/powwie/pl/ray-cast.htm; 1997.

GPU-Based Monte-Carlo Volume Raycasting, Christof Rezk Salama, Computer Graphics Group, University of Siegen, Germany.

Kroes T. et al.: "Exposure Render: An Interactive Photo-Realistic Volume Rendering Framework"; PLOS One; vol. 7; No. 7; pp. e38586; XP055188757; DOI: 10.1371/journal.pone.0038586;; 2012.

Optische Modelle et al.: "Optische Modelle; Hauptseminar Interaktives Volunnenrendering"; pp. 1-23; XP055190803; Gefunden im Internet: URL:https://www.vis.uni-stuttgart.de/uploads/tx_visteaching/Optische_Modelle_-_Daniel_Klier.pdf; 2011.

International Search Report for PCT/EP2014/070231; International Filing Date: Sep. 23, 2014; 2 pgs.

International Preliminary Report on Patentabilityfor PCT/EP2014/070231; International Filing Date: Sep. 23, 2014; 11 pgs.

* cited by examiner

METHOD, VISUALIZATION DEVICE, AND COMPUTER PROGRAM PRODUCT FOR VISUALIZING A THREE-DIMENSIONAL OBJECT

CROSS-REFERENCE TO RELATED APPLICATIONS

This application claims priority to PCT Application No. PCT/EP2014/070231, having a filing date of Sep. 23, 2014, the entire contents of which are hereby incorporated by reference.

FIELD OF TECHNOLOGY

The following relates to the technical field of volume rendering, i.e. visualization of inhomogeneous three-dimensional objects by way of image synthesis. Such objects can be, in particular, real bodies or virtually modeled objects. The visualization of three-dimensional objects has a large number of areas of application, in particular in medicine, in geophysics, in material testing, in the field of virtual reality and/or in computer games.

BACKGROUND

During volume rendering, the interior volume is also visualized, i.e. not merely a surface of an inhomogeneous object, with the result that transparency effects and/or internal structures can be realistically reproduced. The three-dimensional object is here represented by way of volume data in three-dimensional resolution.

A known method for volume rendering is what is referred to as ray casting, in which the propagation of imaginary rays, referred to below as visual rays, is simulated, which emerge from the eye of an imaginary observer or an imaginary detector and pass through the object to be visualized. Illumination values for points within the object are ascertained along the visual rays. Finally, a visualized two-dimensional image is composed from the illumination values that were ascertained for the visual rays.

Realistic visualization requires that effects of the global illumination, for example environmental occlusion, shadows, translucency, what is known as color bleeding, surface shading, complex camera effects and/or illumination by way of any desired ambient light conditions, are taken into account as comprehensively as possible. Environmental occlusion is here frequently also referred to as ambient occlusion. Such illumination effects contribute, in particular in volume rendering, significantly to the depth and shape perception and thus to improved image understanding.

Known volume rendering systems frequently take into account local illumination effects, but are unable to realistically incorporate all global illumination effects.

The document "Exposure Render: An Interactive Photo-Realistic Volume Rendering Framework" by Thomas Kroes et al., PLoS ONE, volume 7, issue 7, dated July 2012, discloses a volume rendering method which uses a Monte Carlo simulation together with what is known as Woodcock tracking for tracing visual rays. However, to calculate realistic shading effects, in addition to a respective visual ray further rays need to be traced within the object volume, which requires a significant computational outlay. Moreover, what is known as importance sampling is necessary, which influences the statistical properties of the Monte Carlo method.

SUMMARY

An aspect relates to specify a method, a visualization device, and a computer program product (non-transitory computer readable storage medium having instructions, which when executed by a processor, perform actions) for visualizing a three-dimensional object, which permits efficient incorporation of global illumination effects.

For visualizing an inhomogeneous three-dimensional object, which is represented by volume data, a large number of visual rays are simulated for a respective visualization pixel, which visual rays are associated with the visualization pixel. The volume data here indicates a density of the object to be imaged in an object volume. The density can here be in particular a physical density, an optical density, a refractive index and/or a brightness value, color value, transparency value and/or opacity value and be given in scalar, vectorial or tensorial form. The visualization pixels can be arranged in particular virtually on an imaging plane or a curved imaging surface. According to embodiments of the invention, for a respective visual ray that enters the object volume, i) a scatter position is determined in dependence on the density along the visual ray, ii) a scatter direction is selected in dependence on a random process, and iii) the visual ray is scattered at the scatter position in the selected scatter direction. The random process can here be based, for example, on a pseudorandom or quasi-random number generator. Steps i) to iii) are repeated until the visual ray is absorbed in the object volume or exits the object volume, wherein the exiting visual ray is incident on an illumination source, and an illumination contribution of the visual ray to the respective visualization pixel is ascertained in dependence on a brightness and/or color value of the illumination source. A statistical average is taken over the respective illumination contributions of the large number of visual rays in order to ascertain a brightness and/or color value for the associated visualization pixel.

The following allows for complex global illumination effects to be taken into account efficiently. On the basis of the scattering of visual rays in a scatter direction, which was selected at random, until absorption or the incidence on an illumination source, cascaded branchings of visual rays or illumination rays, the calculation of which is associated with great outlay, can be avoided, and complex optical paths within the object volume can nevertheless be taken into account.

Advantageous embodiments and developments of the invention are specified in the dependent claims.

According to an advantageous embodiment of the invention, an environment image which surrounds the object volume can be provided as the illumination source. It is possible here for a point of incidence of the exiting visual ray on the environment image and the illumination contribution of the visual ray to be ascertained in dependence on a brightness and/or color value at the point of incidence of the environment image. Such an environment image is frequently also referred to as a light probe or a light map.

Where such an environment image completely or partially surrounds the object volume, it should be expected at least for a significant proportion of the exiting visual rays that they strike an image point of the environment image and thus receive an illumination contribution. It is possible in this manner to prevent a large proportion of the visual rays from being wasted, as it were, i.e. to be traced without providing an illumination contribution.

Using such an environment image, the object can be visualized such as if it were situated in an environment, which is imaged by the environment image, and were here realistically affected by the illumination induced thereby.

According to an embodiment of the invention, a plurality of environment images surrounding the object volume can be provided as illumination sources. Here, a scatter type can be associated with the visual ray and at least one of the environment images can be selected in dependence on the scatter type of the exiting visual ray. The illumination contribution of the visual ray can then be ascertained specifically on the basis of the at least one selected environment image.

The scatter type can specifically be reflective or transmissive. In addition, there can also be a scatter type "non-scattered" for visual rays which are not scattered. A reflective scatter type can preferably be associated with strongly anisotropic scattering in accordance with a reflection at a surface that is at most slightly diffuse, while a transmissive scatter type can be associated with scattering with lower anisotropy in comparison thereto. Preferably in the case of a reflective scatter type, an environment image which is at most slightly unsharp can be selected and a comparatively strongly washed-out environment image can be selected in the case of a transmissive scatter type.

It is possible in particular to produce, from a first one of the environment images, at least one second one of the environment images by way of filtering that is specific for a scatter type. It is thus possible for a first, unfiltered environment image with non-scattered visual rays to be selected, and for a second environment image which is slightly blurred by way of a blurring filter in the case of the reflective scatter type to be selected, and for an environment image that is strongly blurred or diffuse in comparison thereto in the case of a transmissive scatter type to be selected.

It is possible in this way to effectively simulate or implement specific properties of scatterings, such as in particular the anisotropy thereof, by way of correspondingly filtered environment images.

According to an advantageous embodiment of the invention, the illumination contribution of the visual ray can be modified in dependence on a brightness and/or color value of an illumination ray which travels without scattering from an illumination source to the scatter position. This permits specific light influences of the illumination source to be effectively taken into account while avoiding complicated ray tracing.

According to a further embodiment of the invention, at least one preferably two-dimensional light source can be provided as the illumination source. The selection of the scatter direction can here be advantageously limited to scatter directions in the direction of the at least one light source. Since a visual ray which exits the object volume in a random direction can often not be expected to strike the light source, the limitation of the possible scatter directions can cause the proportion of the wasted visual rays, as it were, to be reduced.

Provision can in particular be made for the limitation of the scatter direction to be effected using a prespecified probability, and, if no limitation is given, for a diffuse illumination contribution to be incorporated in the illumination contribution of the exiting visual ray.

According to an embodiment of the invention, the illumination contribution of the visual ray can be influenced by the density at the scatter position.

Preferably, a transfer function can be provided, which images a respective value of the density onto a brightness value, color value, transparency value and/or opacity value. It is possible in this manner to visualize internal structures of the object, which are characterized by varying density or a characteristic density profile, in a specifiable manner by way of colors, brightness, transparency and/or opacity.

In particular, a color value of the illumination contribution of the visual ray which is available before the scattering can be linked to a color value which is associated with the density, i.e. can be multiplied, and the resulting color value can be used in the illumination contribution of the visual ray.

A gradient of the density or a general density profile at the scatter position can furthermore be ascertained and the scatter direction can be selected in dependence on the gradient. The gradient calculation can be done entirely or partially in advance, or alternatively or additionally be triggered by the scattering of the visual ray.

In particular, an absolute value of the gradient can be determined and a reflective and/or refractive scatter type can be associated with the visual ray with a probability that is dependent on the absolute value. A direction of the gradient can then be determined as the surface normal, and when selecting the scatter direction, scatter directions which are reflected and/or refracted with respect to the surface normal can be preferred.

According to an advantageous embodiment of the invention, the scatter position can be ascertained using Woodcock tracking. Preferably, a probability for the scattering of the visual ray can here increase with the length of the distance that is traveled by the visual ray in the object volume.

According to a further embodiment, a number of the scatterings of the visual ray can be ascertained, for example incremented, and the absorption of the visual ray in the object volume can take place as a function of this number. In particular, a maximum number can be specified for the scatterings, and once this maximum number is exceeded, the visual ray is considered to be absorbed.

According to a further embodiment, a respective visual ray which is associated with a visualization pixel can be directed from the visualization pixel onto a randomly selected position on a virtual lens. The visual ray can then be refracted at the selected position in accordance with a refractive index of the virtual lens, and the refracted visual ray can be traced further. In this way, a virtual camera having optical imaging effects such as depth and/or motion blur can be simulated, as a result of which the reality impression can be enhanced.

BRIEF DESCRIPTION

Some of the embodiments will be described in detail, with reference to the following figures, wherein like designations denote like members, wherein.

DETAILED DESCRIPTION

Figure 1:
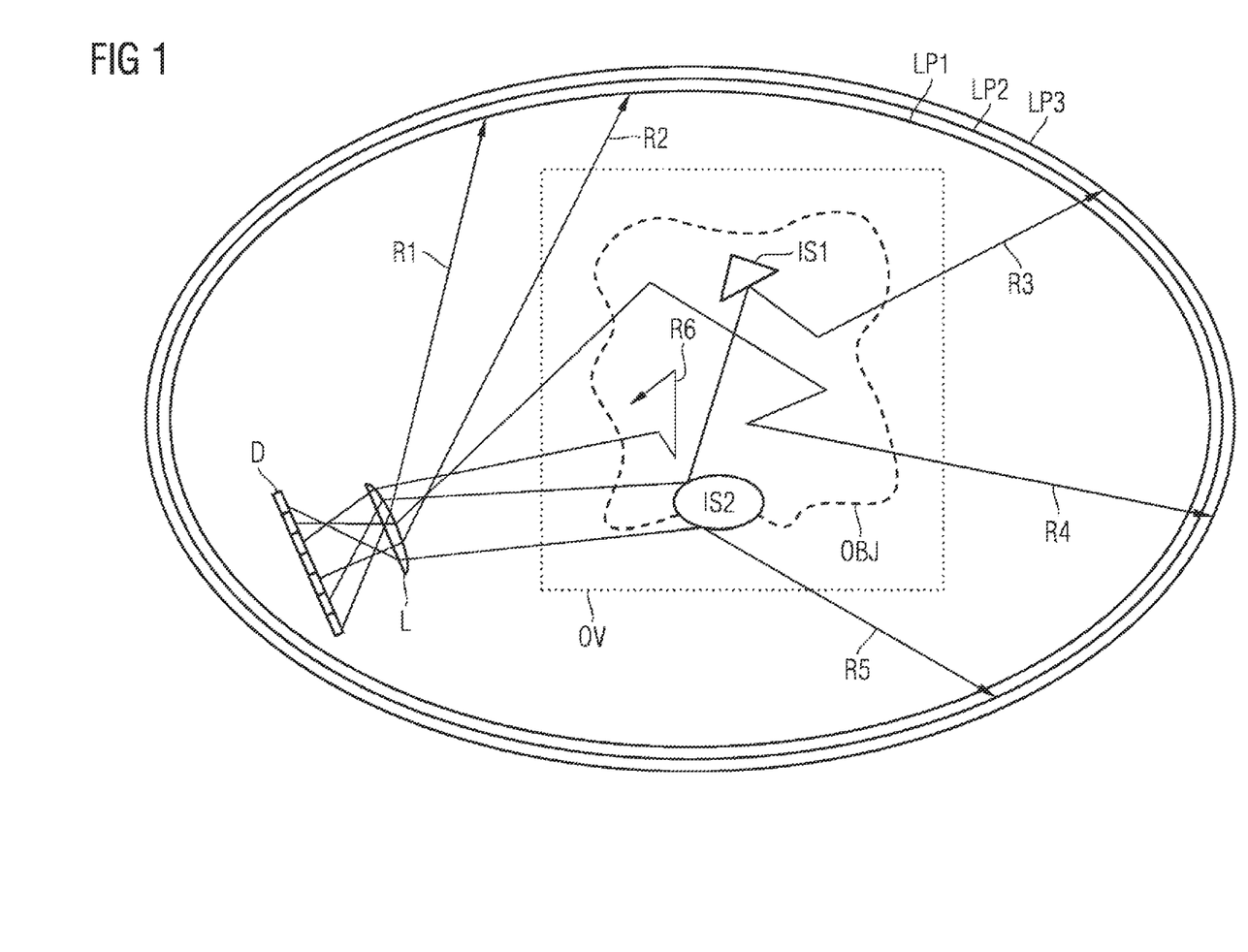
FIG. 1 shows a first schematic illustration of an exemplary embodiment with simulated ray propagation for visualizing a three-dimensional object.
Figure 2:
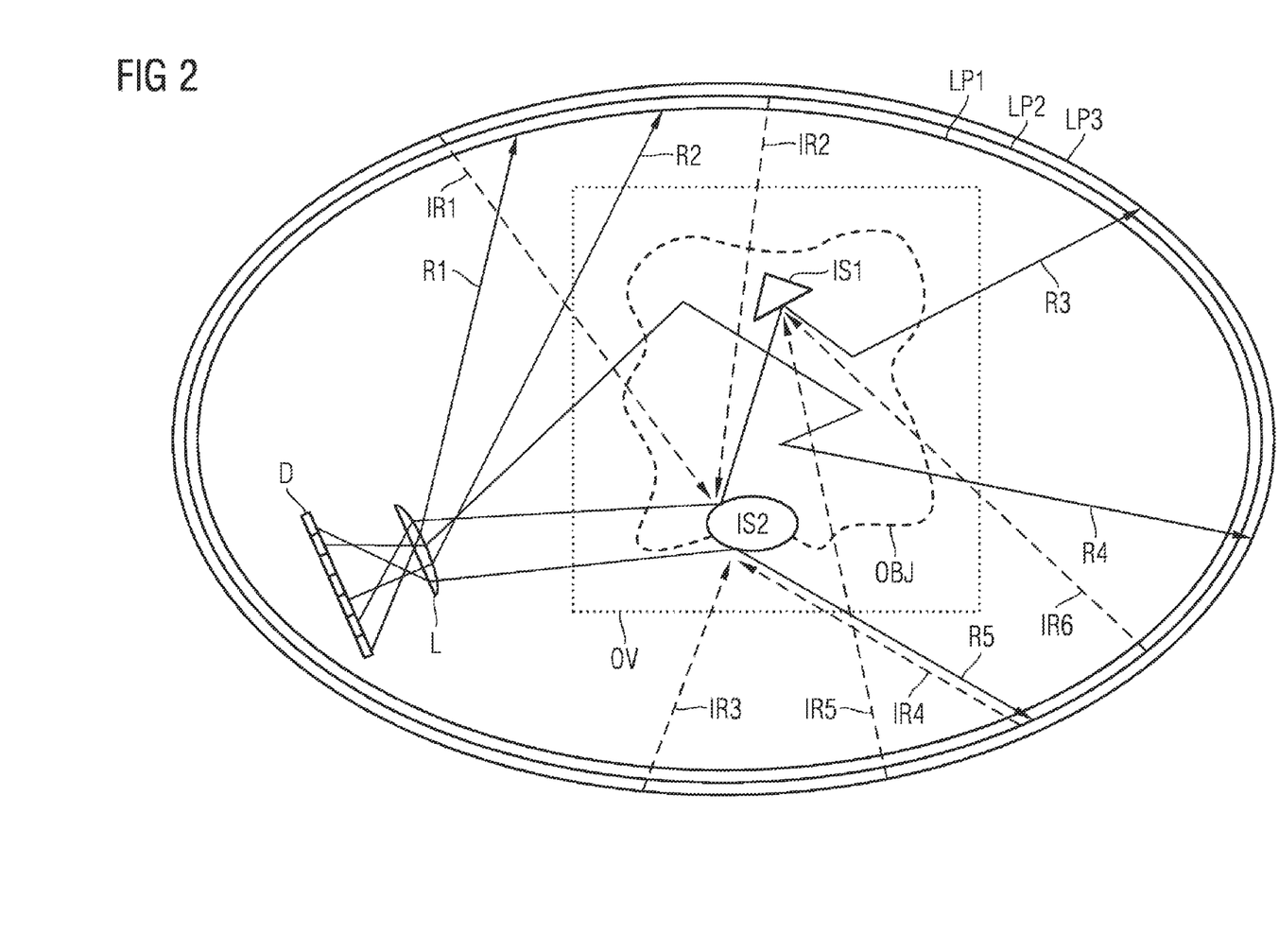
FIG. 2 shows a second schematic illustration of an exemplary embodiment with simulated ray propagation for visualizing a three-dimensional object.
Figure 3:
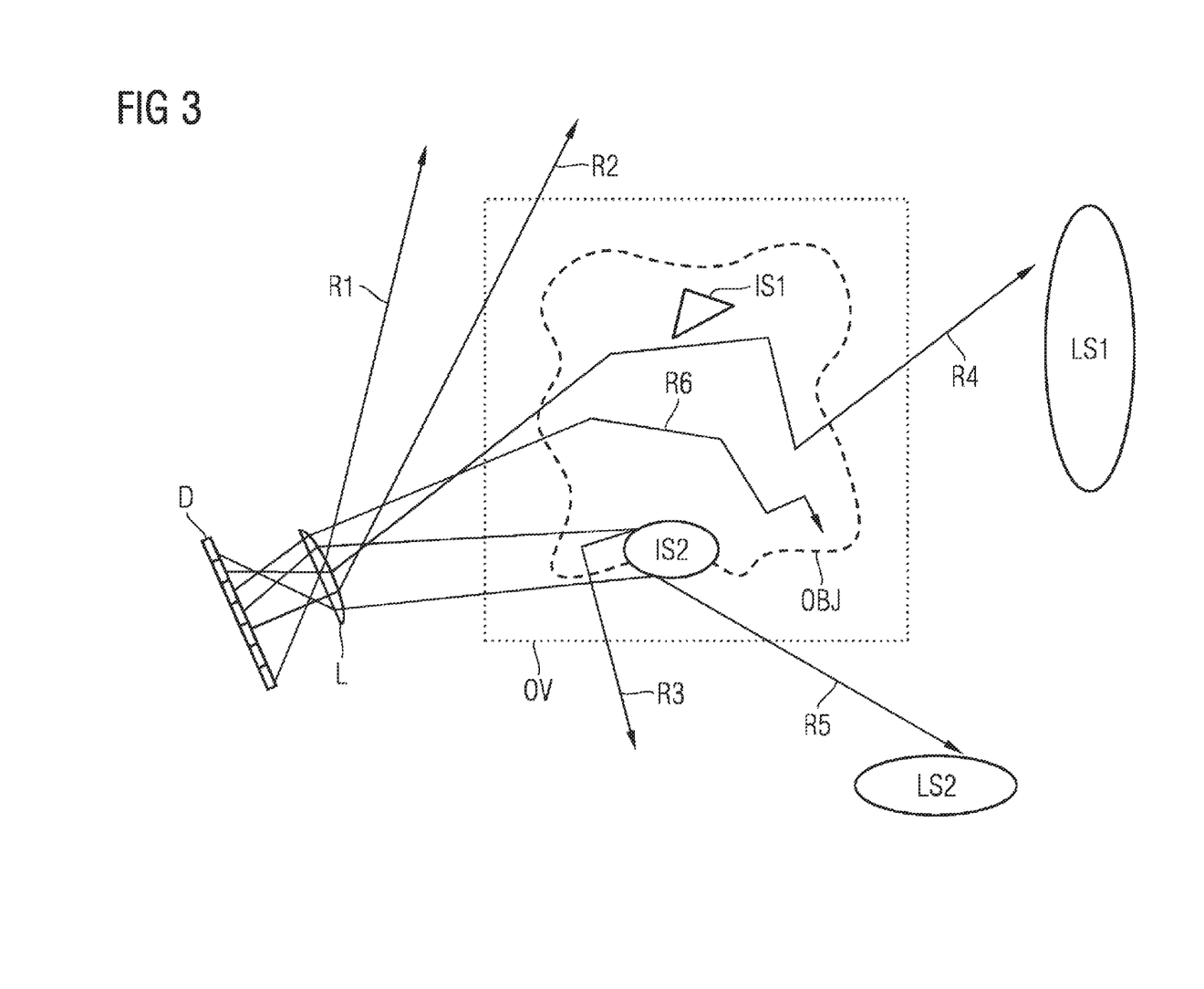
FIG. 3 shows a third schematic illustration of an exemplary embodiment with simulated ray propagation for visualizing a three-dimensional object.

FIGS. 1-3 each illustrate visualization of a three-dimensional object OBJ. The latter can be, for example, a body part which has been virtually modeled on the basis of tomography data. The structures which are illustrated in FIGS. 1-3 are preferably simulated as virtual structures using a computer. A substantial portion of the calculations which are required for this purpose can be outsourced to a graphic card of the computer and can be carried out there in massively parallel manner. The object OBJ is contained in a three-dimensional object volume OV, which is indicated by way of a dotted rectangle. The object OBJ is represented by volume data within the object volume OV, which data gives a density of the object OBJ to be visualized in three-dimensional or spatial resolution. The density can here indicate in particular a physical density, an optical density, a refractive index and/or a brightness, color, transparency and/or opacity of the object OBJ in three-dimensional resolution.

A virtual detector D serves as the imaging plane onto which the visualized object OBJ is virtually projected. The detector D comprises a large number of visualization pixels which are arranged in a virtually two-dimensional fashion. Arranged in front of the detector D is a virtual lens L, which together with the detector D forms a virtual camera. Optical imaging effects, such as depth and/or motion blur, can be simulated by way of the arrangement of the detector D and the lens L.

The object OBJ has, as examples of internal structures, an implicit first surface IS1 and an implicit second surface IS2. Internal or external regions of the object OBJ where a density profile exhibits a jump, as it were, i.e. for which an absolute value of a gradient of the density locally becomes very large, can be understood or identified as implicit surfaces. This is the case for example at the transition from muscle tissue to bone tissue. The corresponding transition can then be identified as a bone surface. It is then possible to associate preferably reflective properties with a surface which is identified in this way, in this case IS1 and IS2.

A large number of simulated visual rays emerge from a respective visualization pixel of the detector D. For the present exemplary embodiments, exemplary visual rays R1, . . . , R6 are indicated in FIGS. 1-3. A visual ray R1, . . . , R6, which emerges from a respective visualization pixel of the detector D, is preferably directed onto a randomly selected position on the virtual lens L and refracted at the selected position in accordance with a refractive index of the lens L in accordance with the physical law of refraction. The refracted visual ray R1, . . . , R6 is then traced further. In order to produce an image of the object OBJ to be visualized, which is to be presented to a user, a large number of visual rays are simulated, i.e. calculated, for a respective visualization pixel of the detector D. Statistical averaging is then effected in a visualization-pixel-wise manner over the large number of visual rays. As further visual rays are calculated in the course of the visualization, a quality of the produced image successively improves, i.e. statistical image noise decreases in the course of the simulation.

An illumination contribution, which preferably contains a color value, is associated with each visual ray emerging from a visualization pixel. The color value is initially initialized to the color white. For the visual rays which are refracted by the lens L, an ascertainment is respectively carried out as to whether or not they enter the object volume OV. In the present exemplary embodiments, the visual ray R1 does not enter the object volume OV, while the other visual rays R2, . . . , R6 do enter the object volume OV. For the visual rays R2, . . . , R6, which enter the object volume OV, in each case a scatter position within the object volume OV is ascertained using what is usually referred to as Woodcock tracking. During Woodcock tracking, a scatter probability increases in dependence on the preferably interpolated density of the object OBJ along the respective visual ray with the length of the path traveled in the object volume OV. At the ascertained scatter position, scattering of the respective visual ray is simulated. The scattering changes the direction of the visual ray, which is indicated in FIGS. 1-3 by way of corresponding kinks at the respective scatter position. In particular, a respective visual ray is scattered without branching. It is possible in this way to avoid cascaded branching of visual rays or branched trees of visual rays, which are complicated to calculate.

The scatter direction is selected by way of a random process. Here, preferably a probability density function, also abbreviated as PDF, is used, which indicates for a respective scatter position the probability with which the visual ray is scattered in a respective scatter direction. Such a probability density function is also frequently referred to as a phase function. The phase function can be derived from local material properties of the object OBJ, for example on the basis of local x-ray attenuation derived from tomography data or absorption according to what is known as the "Hounsfield scale." The local material properties are preferably coded as a component of the density in the volume data of the object OBJ. The volume data is preferably coded such that the density and the data that is derived therefrom can be efficiently interpolated at every position of the object volume OV and in particular along the visual rays and the scatter positions thereof.

A local color at the scatter position can be derived by applying a transfer function to the preferably interpolated density or its components. The transfer function can for example associate with higher densities a darker, more saturated and/or different color than with lower densities. The color that is present at the scatter position is combined with the color that is associated with the respective visual ray, for example multiplied, in order to model an interaction between light and the object OBJ at the scatter position.

The visual ray R3, . . . , R6 which is scattered in the random-based scatter direction is traced further using Woodstock tracking in order to determine in this way the next scatter position, where the same operations as for the previous scatter position are used. This process is repeated until the respective visual ray is absorbed in the object volume OV or exits the object volume OV. The absorption can here be modeled by specifying a maximum number of scatter operations, and when this number is exceeded, the respective visual ray is considered to be absorbed, or by using a probability density function for the extinction of a respective visual ray on the basis of the number of scatter events. Such a combination of Woodcock tracking with random-based scattering is frequently also referred to as Monte Carlo rendering.

In the exemplary embodiments illustrated in FIG. 1 and FIG. 2, environment images LP1, LP2 and LP3 surrounding the object volume OV are provided as illumination sources. Such environment images are frequently also referred to as "light probe" or "light map." The environment images LP1, LP2 and LP3 preferably surround the object volume OV as completely as possible, such that if possible, every visual ray that exits the object volume OV is incident on one of the environment images LP1, LP2 or LP3. The environment images LP1, LP2 or LP3 are in each case arranged, or projected, such that they image the respective view, as an observer located in the object volume OV would have of the imaged environment.

Supposing it is assumed for the exemplary embodiment illustrated by FIGS. 1 and 2 that the environment image LP1 is an unfiltered environment image, for example an all-around image of a street. The environment image LP2 is a reflective environment image which is produced from the environment image LP1 by applying a slight blur filter. The environment image LP2 is thus a slightly blurred version of the environment image LP1. In addition, the environment image LP3 is a diffuse environment image which is produced from the environment image LP1 by applying a strong blur filter. The environment image LP3 is thus a strongly blurred or almost diffuse version of the environment image LP1. An almost diffuse environment image LP3 of this type is frequently also referred to as "irradiance light map."

Using the unfiltered environment image LP1, the illumination contribution of a non-scattered visual ray is ascertained. Accordingly, the illumination contribution of a visual ray that is only reflected is ascertained on the basis of the reflective environment image LP2, and the illumination contribution of a transmissively scattered visual ray is ascertained on the basis of the diffuse environment image LP3. The illumination contribution of the respective visual ray is ascertained in dependence on a brightness and/or color value at the point of incidence of the visual ray on the environment image.

In FIG. 1, the visual ray R1, which is tracked further, does not strike the object volume OV, but rather the unfiltered environment image LP1 as a non-scattered visual ray. This also applies to the visual ray R2, which passes through the object volume OV, but is not scattered here and thus likewise receives its illumination contribution in dependence on the brightness or color value of the environment image LP1 at the point of incidence.

The visual ray R3 is initially scattered in the object volume OV at the second surface IS2, then at the first surface IS1, in each case reflectively, and is subsequently transmissively scattered once again inside the object OBJ, before it exits the object volume OV. Due to the transmissive scattering, a transmissive scatter type is associated with the visual ray R3 and, in dependence thereon, the diffuse environment image LP3 is selected in order to ascertain the illumination contribution of the visual ray R3 in dependence on the brightness or color value at the point of incidence of the environment image LP3. The visual ray R4 is transmissively scattered inside the object OBJ at three scatter positions in each case in a random-based scatter direction, before it exits the object volume OV. Due to the transmissive scattering, a transmissive scatter type is associated with the visual ray R4 and its illumination contribution is accordingly ascertained on the basis of the diffuse environment image LP3.

The visual ray R5 is scattered only once, specifically reflectively, inside the object volume OV at the second surface IS2, before it exits the object volume OV. Due to the reflective scattering, a reflective scatter type is associated with the visual ray R5, and its illumination contribution is ascertained on the basis of the reflective environment image LP2, i.e. on the basis of a brightness and/or color value of the environment image LP2 at the point of incidence.

The visual ray R6 is transmissively scattered inside the object OBJ at three scatter positions in each case in a random-based direction and is then absorbed inside the object OBJ, for example owing to a high local density near the last scatter position. To the extent that the visual ray R6 remains within the object volume OV after all the scatter events, this visual ray R6 receives no illumination contribution, as opposed to the visual rays R1, ..., R5, which exit the object volume OV and receive an illumination contribution from an environment image LP1, LP2 or LP3. The resulting illumination contribution or the resulting color of the respective visual ray is then added to the respectively associated visualization pixel of the detector D.

For calculating surface shading effects for implicit surfaces, in this case IS1 and IS2, within the object volume OV, a local gradient of the density is interpolated at the scatter position from the volume data for a respective scatter position of a visual ray, and a probabilistic surface scatter event is modeled in dependence on the absolute value of the gradient. Such a surface scatter event can be reflective scattering, for example a reflection of the visual ray, or refraction of the visual ray at the implicit surface. If such reflective scattering occurs, a random scatter direction in the hemisphere of the surface normal given by a direction of the local density gradient is selected. The probability for reflective scattering is determined preferably on the basis of what is known as a BRDF (bidirectional reflectance distribution function) of the volume data that has been interpolated for the scatter position. In the case of reflective scatterings, scatter directions along a reflection direction in accordance with the physical law of reflection are much preferred over other directions of the hemisphere. The reflectively scattered visual ray is thus focused probabilistically, as it were, in the reflection direction specified by the law of reflection. A reflective scatter type is associated with a visual ray which is scattered only reflectively, in this case the visual ray R5. If a visual ray which is only scattered reflectively exits the object volume OV, the illumination contribution of this visual ray is ascertained on the basis of the brightness and/or color value of the reflective environment image LP2 at the point of incidence. If a respective visual ray is scattered transmissively, a transmissive scatter type is associated with it, as already mentioned above, and its illumination contribution is ascertained on the basis of the environment image LP3, if it exits the object volume OV. In both cases, the illumination contribution is combined with the color that is associated with the respective visual ray, for example multiplied, and added to the respectively associated visualization pixel. A visual ray that does not strike the object volume OV, in this case R1, or is not scattered in the object volume OV, in this case R2, receives an illumination contribution from the unfiltered environment image LP1.

FIG. 2 illustrates a variant of embodiments of the invention in which additional contributions are incorporated in the illumination contribution of a respective visual ray. For this purpose, illumination rays IR1, ..., IR6 are simulated as additional contributions to the illumination contribution of the respective visual ray. The illumination rays IR1, ..., IR6 are additionally calculated for each reflective scatter position within the object volume OV and indicated in FIG. 2 by way of dashed arrows.

In FIG. 2, the visual rays R1, ..., R5, as already explained in connection with FIG. 1, are scattered and receive corresponding illumination contributions. In addition to these illumination contributions, which are described in connection with FIG. 1, additional contributions to the illumination contribution of the respective visual ray R3 or R5 are added by way of the illumination rays IR1, ..., IR6 for each reflective scattering, here of the visual rays R3 and R5, in the exemplary embodiment illustrated in FIG. 2. For example, for the reflective scattering of the visual ray R5 at the second surface IS2, contributions of the illumination rays IR3 and IR4 are added to the illumination contribution of the visual ray R5. The illumination ray IR3, which corresponds to a diffuse illumination contribution, here travels from the environment image LP3 to the reflective scatter position, while the illumination ray IR4, which corresponds to a reflective illumination contribution, travels from the environment image LP2 to the reflective scatter position. The starting point of the illumination ray IR3 on the environment image LP3 that is selected is a random position in the hemisphere of the surface IS2 at the reflection point. In the case of the illumination ray IR4, a point in the reflection direction is selected as the starting point on the environment image LP2. On the basis of the contributions of the illumination rays IR3 and IR4 to the reflective scatter position, the associated color value thereof can be modified. Here, the color value that is originally associated with the reflective scatter position can be weighted with a brightness and/or color value of the diffuse illumination ray IR3, and a brightness and/or color value of the reflective illumination ray IR4 can be added thereto. The resulting color value can then be combined with the color value that is associated with the visual ray R5, for example multiplied, in order to thus modify the color value of the visual ray R5 for subsequent scatter events. The illumination method described above for the reflection of the visual ray R5 at the second surface IS2 using the illumination rays IR3 and IR4 is also carried out in the case of the reflective scatterings of the visual ray R3 at the second surface IS2, in this case using the illumination rays IR1 and IR2, and at the first surface IS1, in this case using the illumination rays IR5 and IR6.

The illumination rays IR1, . . . , IR6 are here in each case not scattered and do not branch. In this way, cascaded branchings of illumination rays which are complicated to calculate can be avoided.

FIG. 3 illustrates a further variant of embodiments of the invention, in which, instead of environment images, two-dimensional light sources LS1 and LS2 act as the illumination sources. In this exemplary embodiment, the scatter positions are determined as already described in connection with the preceding exemplary embodiments. However, in contrast to the exemplary embodiments illustrated in FIGS. 1 and 2, in the exemplary embodiment illustrated in FIG. 3, the selection of the scatter direction is limited to scatter directions in the direction of the light sources LS1 and LS2, i.e. for each scatter position, initially one of the light sources LS1 or LS2, possibly weighted with the area thereof, is selected randomly, and subsequently a random position on the surface of the selected light source is determined. Scattering is then effected in the direction of the determined random position.

Since the light sources LS1 and LS2 do not surround the object volume OV, it is possible by way of limiting the selection of the scatter direction to avoid a situation where a significant portion of the visual rays do not strike a light source and would therefore be wasted, as it were. In the exemplary embodiment illustrated in FIG. 3, the visual rays R1 and R2 are not scattered in the object volume and also do not strike either of the light sources LS1 and LS2. Accordingly, they do not receive an illumination contribution. The visual ray R5 is reflected at the second surface IS2 and strikes the light source LS2, the brightness and/or color value of which is added to the illumination contribution of the visual ray R5. The visual ray R6 is transmissively scattered four times within the object OBJ, wherein the scatter direction in each case points in the direction of one of the light sources LS1 or LS2. After the fourth scattering, the visual ray R6 is absorbed in the object OBJ and does not offer any illumination contribution to the associated visualization pixel of the detector D. The visual ray R4 is scattered inside the object OBJ three times, in each case in the direction of one of the light sources LS1 and LS2, and finally exits the object volume OV in the direction of the light source LS1, the brightness and/or color value of which is added to the illumination contribution of the visual ray R4.

If the scatter directions were limited as described without exception for each scattering, not all possible optical paths through the object volume OV could be taken into account. The result of this would be that regions within the object volume OV could be non-illuminated and would therefore appear completely black on the visualized image. To avoid such non-illuminated regions, non-limited scatterings with a specified probability can also be permitted for selection. That means that below a probability threshold, which may be specified for example by the user, instead of scattering in the direction of the light sources LS1 or LS2, scattering in any desired, preferably statistically uniformly distributed direction may also be permitted. Preferably a specific scatter type, such as for example "ambient lighting," can be associated with such a visual ray which is scattered without limitation.

Accordingly, in FIG. 3, the visual ray R3 is initially scattered at the second surface IS2 in a non-limited random direction and subsequently scattered again inside the object OBJ in a non-limited random direction. The scatter type "ambient lighting" is associated accordingly with the visual ray R3. The visual ray R3 exits the object volume OV and does not strike either of the light sources LS1 or LS2. However, as a visual ray which has been associated with the scatter type "ambient lighting," R3 receives a weak diffuse and isotropic ambient light contribution, which is frequently also referred to as "ambient occlusion lighting." In this way, completely non-illuminated regions of the object OBJ can be effectively avoided.

The visualization pixels of the detector D form a visualization image buffer, which contains the statistically averaged illumination contributions of all visual rays. This visualization image buffer is continuously presented to the user and is constantly refined by calculating further visual rays in the background. In the case of high-contrast images, which are known as "high dynamic range images" (HDRI), dynamic compression can be carried out before the visualization image is presented to the user. If visualization parameters change, such as for example a position of the virtual camera, the visualization image buffer can be deleted and the calculation of visual rays can be restarted. Since the visual rays and illumination contributions can be calculated independently from one another, the visualization method according to embodiments of the invention can be parallelized well and thus be performed effectively on a multicore architecture or on a graphic card that operates in massively parallel fashion.

By using a Monte Carlo method for color tracking, embodiments of the invention can take into account any desired optical paths through the object volume OV and simulate complex illumination effects and camera models. Owing to a stochastic nature of the method, a large number even of complex optical paths within the object volume OV can be taken into account in order to produce, over time, a smooth, photorealistic visualization image. The method is very efficient, since only one path through the object volume OV must be traced using Woodcock tracking for a respective visual ray.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A method for visualizing an inhomogeneous three-dimensional object, which is represented by a volume data, wherein the volume data indicates a density of the inhomogeneous three-dimensional object to be imaged in an object volume, said method comprising:
    simulating visual rays for a respective visualization pixel, wherein the visual rays enter the object volume;
    wherein, for a respective visual ray of the visualization rays that enter the object volume the following steps are taken:
        determining a scatter position in dependence on a density along the respective visual ray,
        selecting a scatter direction in dependence on a random process,
        scattering the respective visual ray at the scatter position in the selected scatter direction, and
        repeating said determining, said selecting, and said scattering until the respective visual ray is absorbed in the object volume or exits the object volume,
        wherein a plurality of environment images surrounding the object volume are provided as illumination sources, an exiting visual ray is incident on an illumination source and, an illumination contribution of the visual ray to the respective visualization pixel is ascertained, wherein the illumination contribution is dependent on the brightness and/or color value of the illumination source,
        wherein a scatter type is associated with the respective visual ray,
        wherein at least one of the plurality of environment images is selected in dependence on the scatter type of the exiting visual ray, and
        further wherein a point of incidence of the exiting visual ray on the at least one of the plurality of environment images is ascertained, and the illumination contribution of the respective visual ray is ascertained, wherein the illumination contribution is dependent on a brightness and/or color value at the point of incidence, on the basis of the at least one of the plurality of environment images; and
    taking a statistical average of the illumination contributions of the visual rays in order to ascertain a brightness and/or a color value for the respective visualization pixel.

2. The method of claim 1, further comprising:
producing at least a second one of the plurality of environment images from a first one of the plurality of environment images by way of filtering that is specific for a scatter type.

3. The method of claim 1, further comprising:
providing at least one light source as the illumination source; and
selecting the scatter direction from a limitation of scatter directions of the at least one light source.

4. The method of claim 3, further comprising:
effecting the limitation of the scatter direction using a specified probability; and
in response to a determination that no limitation is given, incorporating a diffuse illumination contribution in the illumination contribution of the existing visual ray.

5. The method of claim 1, further comprising:
influencing the illumination contribution of the respective visual ray by the density at the scatter position.

6. The method of claim 1, further comprising:
providing a transfer function, wherein the transfer function images a respective value of the density onto a brightness value, a color value, a transparency value and/or an opacity value.

7. The method of claim 1, further comprising:
ascertaining a gradient of the density at the scatter position; and
selecting the scatter direction in dependence on the gradient.

8. The method of claim 7, further comprising:
determining an absolute value of the gradient;
in response to associating a reflective scatter type and/or a refractive scatter type of the respective visual ray with a probability that is dependent on the absolute value of the gradient, determining a direction of the gradient as the surface normal; and
selecting the scatter direction that is reflected and/or refracted with respect to the surface normal.

9. The method of claim 1, further comprising:
ascertaining the scatter position using Woodcock tracking.

10. The method of claim 1, further comprising:
ascertaining a number of the scatterings of the respective visual ray; and
determining the absorption of the respective visual ray in the object volume based on the number of the scatterings of the respective visual ray.

11. The method of claim 1, further comprising:
directing the respective visual ray, associated with the respective visualization pixel, from the respective visualization pixel onto a randomly selected position on a virtual lens, wherein the respective visual ray is refracted at the selected position on the virtual lens according to a refractive index of the virtual lens; and
tracing the refracted visual ray.

12. A computer configured to visualize an inhomogeneous three-dimensional object, which is represented by a volume data, wherein said computer device performs the steps of claim 1.

13. A computer program product, comprising a non-transitory computer readable hardware storage device having computer readable program code stored therein, said program code containing instructions, which, upon being executed by a processor of a computer system, implement a method for visualizing an inhomogeneous three-dimensional object, which is represented by a volume data, wherein said method comprises the steps of claim 1.

14. The method of claim 1, wherein the illumination contribution of the visual ray is modified in dependence on a brightness and/or color value of an illumination ray, wherein the illumination ray travels without scattering from an illumination source to the scatter position.

* * * * *

UNITED STATES PATENT AND TRADEMARK OFFICE
CERTIFICATE OF CORRECTION

PATENT NO. : 10,068,368 B2
APPLICATION NO. : 15/512579
DATED : September 4, 2018
INVENTOR(S) : Klaus Engel

It is certified that error appears in the above-identified patent and that said Letters Patent is hereby corrected as shown below:

In the Claims

Column 11, Line 14, delete "volume the following" and insert --volume, the following--

Column 12, Line 46, delete "device"

Signed and Sealed this
Eleventh Day of December, 2018

Andrei Iancu
*Director of the United States Patent and Trademark Office*